United States Patent [19]
Schultz

[11] 3,986,421
[45] Oct. 19, 1976

[54] SAW BLADE HAVING INVERSE HALF-CONICAL VARYING RADIUS RAKING SURFACE

[76] Inventor: Robert M. Schultz, 85 Liberty Ave., Jersey City, N.J. 07306

[22] Filed: July 11, 1975

[21] Appl. No.: 595,173

[52] U.S. Cl. ................................. 83/854
[51] Int. Cl.² ............... B27B 33/02; B23D 61/02
[58] Field of Search ........... 83/853, 854, 855, 852, 83/835

[56] References Cited
UNITED STATES PATENTS

| | | | |
|---|---|---|---|
| 192,090 | 6/1877 | Spaulding | 83/853 |
| 2,648,360 | 8/1953 | Pall | 83/853 |
| 3,362,446 | 1/1968 | Potomak | 83/855 |

Primary Examiner—Robert Louis Spruill
Attorney, Agent, or Firm—Silverman and Jackson

[57] ABSTRACT

The present invention relates to an improvement in the configuration of concave saw teeth of a circular saw. More particularly, the present invention comprises an inverse, half-conical, varying radius raking surface for a concave saw tooth of a circular saw.

3 Claims, 9 Drawing Figures

SAW BLADE HAVING INVERSE HALF-CONICAL VARYING RADIUS RAKING SURFACE

REFERENCE TO RELATED APPLICATION

This application is related to co-pending Ser. No. Ser. No. 595,172 entitled Method of Regrinding Concave Teeth of Blade of Circular Saw, filed upon the same date as this application.

BACKGROUND OF THE INVENTION

The present invention relates to improvement in circular saws, and more particularly to those saws of a carbide-tipped type.

More particularly, the present invention relates to an improved design for the raking surfaces of circular saws having concave teeth.

The prior art has seen a wide variety of circular cutting saws and, more specifically, those saws provided with cutting teeth having a concave surface. Saw blades fitted with such concave raking surfaces have been highly regarded for their superior cutting characteristics. However, the use of such blade has been limited because of the expense and difficulty which has been encountered in attempts to adequately effectuate the regrinding of the teeth of such saws. This problem is due, in large measure, to the rapid consumption of the small diameter grinding wheels which must be utilized in the regrinding of such concave teeth. This situation is shown in FIGS. 1A (a typical prior art concave surface) and FIG. 1B which indicates, at diameter D1, the limited size which a grinding wheel utilized in the prior art area must, of necessity, possess.

As a consequence of the small diameter D1 possessed by grinding wheels utilized in association with the reconstitution of prior art concave surfaces, it can be appreciated that a relatively long period of time is required in order to effectuate the grinding of each tooth. In addition, it can be appreciated that, as an inevitable consequence of the shape of any concave tooth having a uniform radius, the size of the gullet 18 (see FIG. 1B) associated with each tooth will, of physical necessity, have a minimum radius. As a result of such a minimum radius, the total number of teeth (occasionally referred to as tips) which can be placed upon a saw of given circumference has, in the prior art, been limited.

A further shortcoming attendant in the prior art has been the phenomenon of undue chipping of the materials being cut. This is a particularly undesirable characteristic when the material being cut is one having a special susceptibility to chipping, as for example, in the case of flakeboard coated on both surfaces with a hard, brittle decorative melamine skin.

In light of the above, it is the intent of the present invention to provide a concave cutting surface having a configuration which will permit the use of significantly larger diameter grinding wheels, thereby significantly reducing grinding time, significantly increasing the life of the grinding wheels, and permitting the design and construction of saw blades having concave teeth, without regard to the number of teeth per blade.

SUMMARY OF THE INVENTION

The present invention comprises a circular cutting saw having a multiplicity of concave teeth, each of said teeth having a raking surface configured in an essentially half-conical varying radius surface. The curvature of the present novel raking surface is greatest at the peripheral area of the circular saw, and is least at that area of the raking surface which merges into the gullet of the saw. Through the employment of a greater degree of concave curvature at the peripheral surface of the saw, a maximum cutting effect is obtained at precisely that area at which the cutting requirement is greatest.

Accordingly, it is an object of the present invention to provide a circular saw having highly efficient raking surfaces, particularly with respect to the desired characteristic of obtaining a chip-free cutting performance.

A second object of the present invention is to provide a circular saw having raking surfaces whose configuration does not limit the number of teeth that can be formed within a saw of a given circumference.

It is a further object of the present invention to provide a circular saw having raking surfaces that, after they have become worn, can be readily reconstituted to their original efficiency through the use of a grinding wheel having a life expectancy significantly greater than grinding wheels utilized in prior art concave surfaces.

BRIEF DESCRIPTION OF THE DRAWNGS

DETAILED DESCRIPTION OF THE INVENTION

Figure 1A:
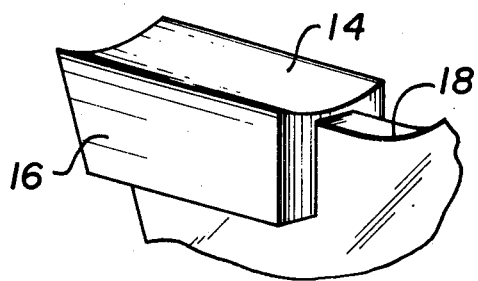
FIG. 1A is a perspective view of a prior art concave tooth of a cutting saw.
Figure 2:
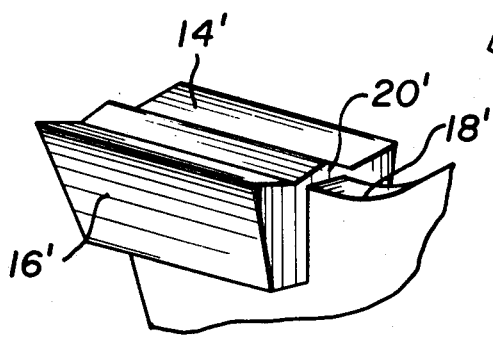
FIG. 2 is a perspective view of a second type of concave cutting tooth, having extreme difficulty in the re-sharpening thereof.

Shown in FIGS. 1A and 2 are concave teeth of reprsentative prior art circular saws. The tooth of FIG. 1A comprises a cutting or raking surface 14, a pair of lateral cutting edges 16 and a gullet 18.

Figure 1B:
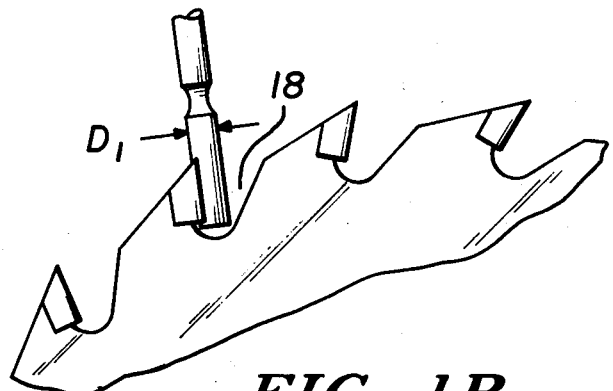
FIG. 1B is a schematic view of the regrinding method utilized for prior art concave teeth of the type of FIG. 1B.

The relationship between these elements is further shown in FIG. 1B which illustrates the grinding technique utilized in order to sharpen a surface of the type of FIG. 1A. It is noted that a small cylindrical grinding element, having a diameter D1 is required in order to sharpen the uniform radius surface 14. As can be further appreciated by an observation of FIG. 1, the minimum size of the gullet 18 is determined by the size of diameter D1. In other words, the number of teeth which can be formed within a prior art circular saw is limited by the mode of regrinding which is necessitated by the prior art design.

With reference to the prior art design of FIG. 2, it may readily be appreciated that the regrinding of such a surface presents a matter of extreme complexity and, therefore, has not proved to be economically practical.

Figure 3:
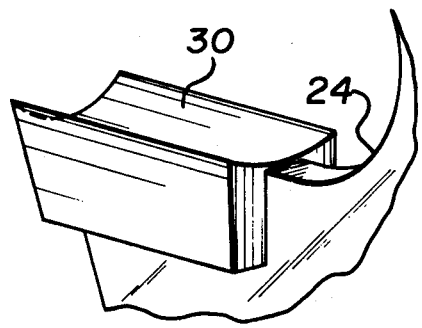
FIG. 3 is a perspective view of the present inventive concave cutting tooth and its raking surface.
Figure 4:
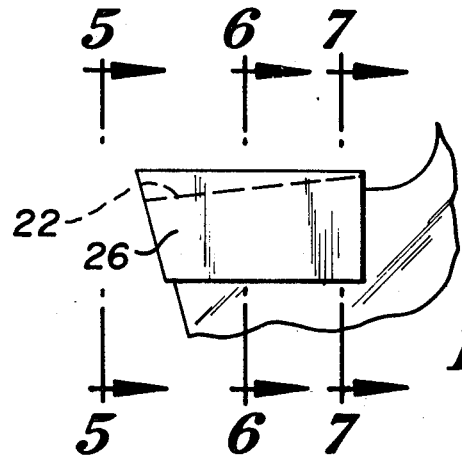
FIG. 4 is a side cross-sectional schematic view of FIG. 3.
Figure 8:
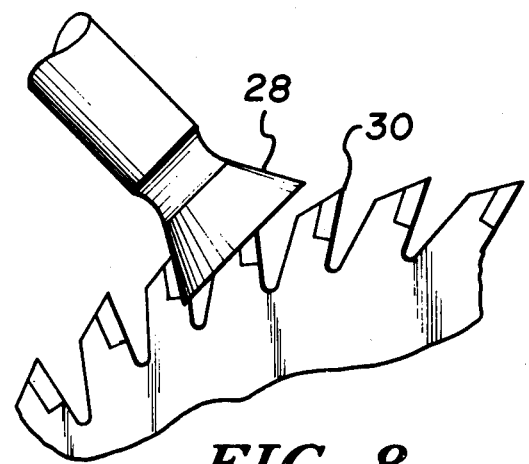
FIG. 8 is a cross-sectional schematic view of a grinding wheel, and its associated method of use, utilized in association with the present inventive cutting surface.

Shown in FIGS. 3 and 4 is the present inventive concave surface for a cutting tooth. As may be noted, the present inventive raking surface possesses a line 22 of progression of curvature which leads naturally into a gullet 24. It is to be noted that, by virtue of the use of the regrinding method and tool shown in FIG. 8, the surface 30 of FIG. 3 permits a gullet 24 of sufficiently small radius to be attained so that virtually any number of cutting tips may be incorporated into a saw of a given size. This benefit derives from the fact that the cutting tool 28 comprises an essentially hollow frustroconical element which overlaps an adjacent tooth 30 while the rotation of said tool 28 occurs. The use of such a hollow frustroconical element is made possible by the unique varying radius shape of the surface 30 of the present invention.

Figure 6:
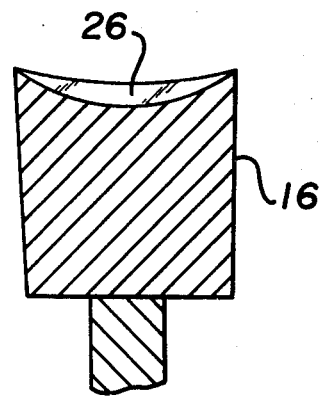
FIG. 6 is a cross-sectional view taken along line 6—6 of FIG. 4.
Figure 7:
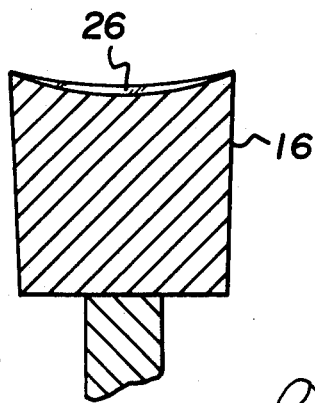
FIG. 7 is a cross-sectional view taken along line 7—7 of FIG. 4.

It is to be furthr noted, within FIGS. 3 and 4, that the radius of curvature of the raking surface 30 become progressively greater as one moves in the direction of gullet 24. That is, the curvature of the raking surface is most accentuated at the circumferential edge of the saw (see FIG. 5) and is least accentuated at the interface of the raking surface with the gullet 24 (see FIG. 7). This progression and change of curvature is also shown in FIG. 6 which, more particularly, illustrates an intermediate degree of curvature which exists at the middle of the tooth 26.

Through the implementation of a raking surface which permits the formation of a gullet enabling a larger number of teeth to be formed within a given circumference, the fineness of cut, or chip-free cutting performance, of the saw will be substantially improved. That is, both the degree of the closeness of the teeth of the saw, as well as the number of teeth per se, will act in order to increase the chip-free characteristic of the cut thereby attainable.

Figure 5:
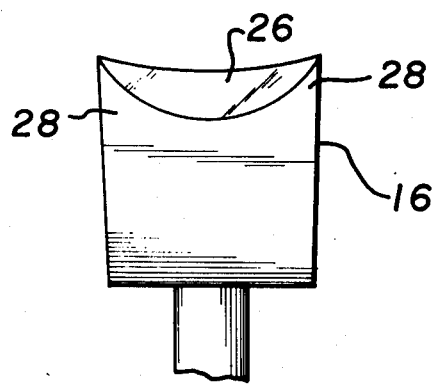
FIG. 5 is a cross-sectional view taken along line 5—5 of FIG. 4.

It is to be noted, with particular reference to FIG. 5, that the present inventive surface creates an acute angle 28 between the lateral surface 16 and the curved surface 26. This angle acts to create a so-called shear on either side of said angle 28, thereby creating what is termed a spur action, with a resultant cut being obtained which is both cleaner and more chip-free than has heretofore been obtained in the art.

The degree to which the present invention is capable of producing a saw having a greater number of concave teeth may be seen through a comparison of the so-called pitches of the respective saws. Pitch is defined as the ratio of the blade circumference to the number of teeth within said circumference. In the prior art, the smallest pitch attainable, e.g., through the prior art embodiment of FIG. 1A, was that of 0.38K, where K represents a so-called blade constant. In the present invention, pitches of 0.2K and less have been attained. Thus, it is seen that at least twice as many teeth, having the configuration hereinabove described, may be formed within a saw as opposed to the prior art saw having the embodiment of FIG. 1A.

It is to be further appreciated that a significant feature of the present inventive raking surface resides in the fact that, after extended usage and resultant wear, the surface 30 can be readily reconstituted to its original curvature. This method of reconstitution is disclosed in co-pending application Ser. No. (Attorney's Docket No. 187). Accordingly, it may be appreciated that unlike much of the prior art in this field, the present raking surface is ideally suited to regrinding (or reconstitution) without the utilization of time-consuming, uneconomical procedures often involving both complicated and expensive grinding machinery.

While there have been herein shown and described the preferred embodiments of the present invention, it will be understood that the invention may be embodied otherwise than as herein specifically illustrated or described and that within said embodiments certain changes in the detail and construction, and the form of arrangement of the parts may be made without departing from the underlying idea of principles of this invention within the scope of the appended claims.

Having thus described my invention, what I claim as new, useful and non-obvious and, accordingly secure by Letters Patent of the United States is;

1. A circular saw comprising a multipicity of saw teeth, each tooth of said multiplicity having a inverse, half-conical, varying radius, said radius becoming greater with movement away from the circumferential surface of said saw and, further, each of said teeth having a progression of change of radius which naturally merges into a gullet configuration having as small a radius of curvature as may be desired.

2. The circular saw as recited in claim 1 in which the gullet of said saw possesses a pitch of less than 0.2K.

3. The saw as recited in claim 1 in which the line of progression of change of radius has a range of between 3° and 20° with respect to a plane defined by the two edges of each tooth, said edges each being defined by the intersection of the cutting surface and the lateral surfaces of each tooth.

* * * * *